United States Patent [19]

Dunajtschik

[11] Patent Number: 4,596,205
[45] Date of Patent: Jun. 24, 1986

[54] COATING DEVICE WITH AN ALLOCATED CLEANSING DEVICE

[75] Inventor: Rudolf Dunajtschik, Lindau-Bodolz, Fed. Rep. of Germany

[73] Assignee: Driam Metallprodukt GmbH & Co. KG, Eriskirch, Fed. Rep. of Germany

[21] Appl. No.: 690,489

[22] PCT Filed: Apr. 10, 1984

[86] PCT No.: PCT/EP84/00109
  § 371 Date: Dec. 20, 1984
  § 102(e) Date: Dec. 20, 1984

[87] PCT Pub. No.: WO84/04261
  PCT Pub. Date: Nov. 8, 1984

[30] Foreign Application Priority Data

Apr. 27, 1983 [DE] Fed. Rep. of Germany ....... 3315223

[51] Int. Cl.⁴ .............................................. B05B 15/02
[52] U.S. Cl. ...................................... 118/302; 118/17; 118/19; 118/303
[58] Field of Search ................... 118/17, 302, 303, 19, 118/417

[56] References Cited

U.S. PATENT DOCUMENTS 3,876,144 4/1975 Madden et al. ................. 118/302 X
3,903,839 9/1975 Rowe et al. ..................... 118/302 X
4,337,282 6/1982 Springer ......................... 118/302 X

FOREIGN PATENT DOCUMENTS 2095586 10/1982 United Kingdom .

*Primary Examiner*—Shrive P. Beck
*Attorney, Agent, or Firm*—Karl F. Ross; Herbert Dubno

[57] ABSTRACT

In a pivoted drum, e.g., a dragée coating drum for coating granular surfaces, a pivoted nozzle carrier (26b) projects along the drum axis, while forming an annular chamber (57), from which extends a multitude of similarly arranged elbows (64) with spray nozzles (65). A casing tube (22) surrounding the nozzle arrangement forms a lid (73) which, when in operating position, is opened by the spray nozzles, so that a spray can be sprayed into the coating chamber outside the casing tube (22). When in cleansing position (65'), the spraying device is completely sealed off to the outside and can be thoroughly rinsed with a cleansing agent which is drained off inside the casing tube (22) by the gutter (69) and the drain pipe (71). The cleansing processes can then be executed during the short intervals between coating, without interrupting the overall program.

22 Claims, 8 Drawing Figures

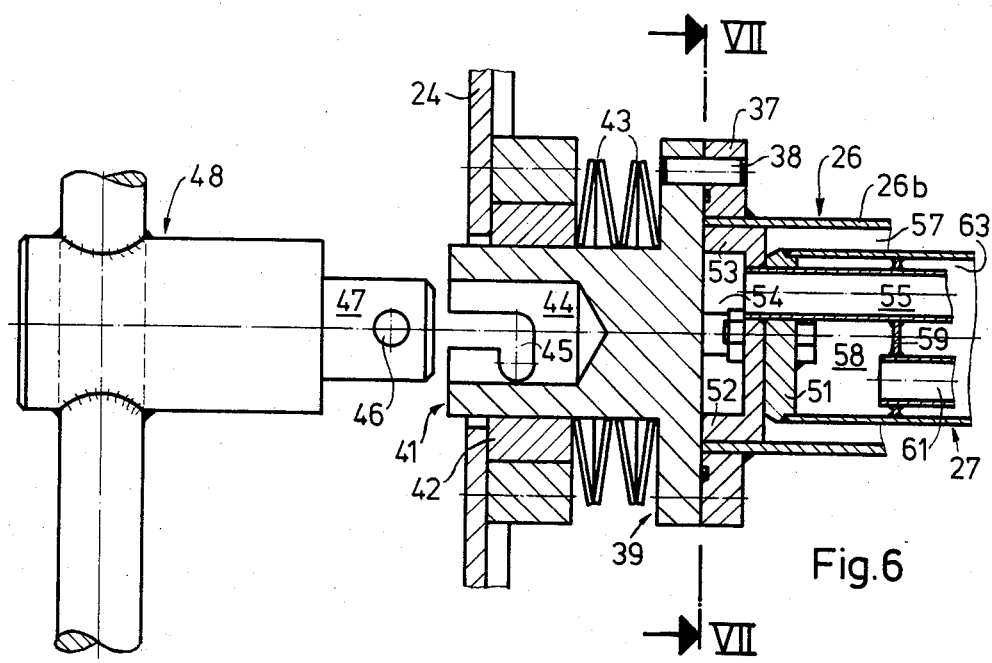
Fig. 6
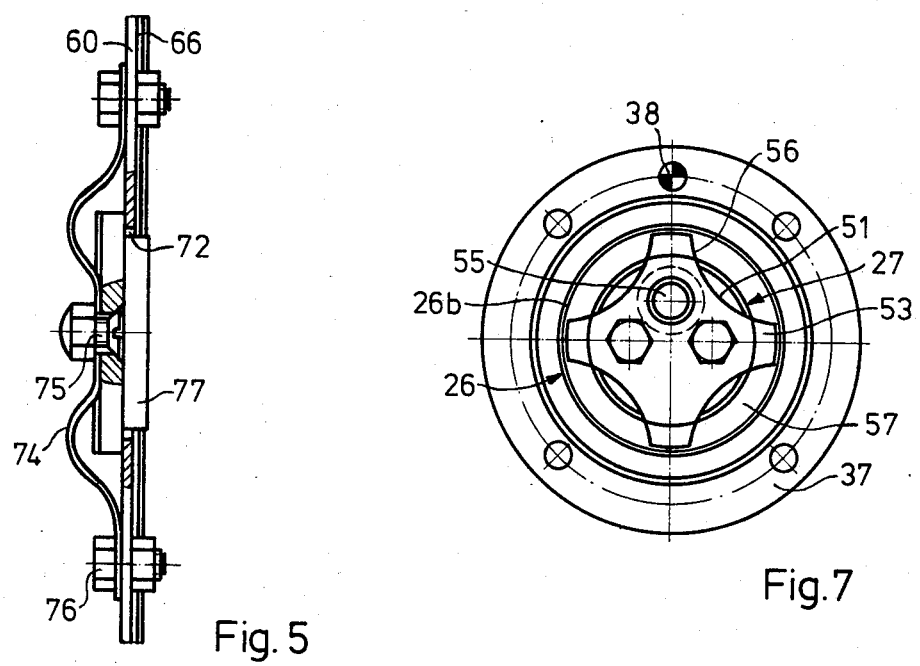
Fig. 5
Fig. 7

COATING DEVICE WITH AN ALLOCATED CLEANSING DEVICE

The invention pertains to a coating device which, in particular, is equipped with a pivoted drum, such as a dragee coating drum, while in a coating chamber a multitude of spray nozzles for coating compound are arranged, and a cleansing device is allocated to these spray nozzles.

The risk involved with devices of this type is that, following the coating process, the coating compound hardens in the pipe or feed paths. For this reason, the nozzle and feed paths must, if possible, be cleansed immediately following the coating process, which necessitates the conducting of a cleansing liquid through the paths with subsequent blowing out by means of compressed air or cleansing gas. As this, as a rule, must be brought about when the sprayed compound, e.g., a charge of the dragees that are to be coated, is still in the coating chamber, it has always been the case that the entire nozzle arrangement had to be removed from the coating chamber, unless said arrangement was located outside the coating chamber and, therefore, was sprayed only into the coating chamber. This, for instance, can be managed with short coating drums which are primarily carried unilaterally. On the other hand, problems occur with the more recently developed elongated coating drums or other large-scale coating chambers, in which a multitude of spray nozzles is so distributed that already during the spraying process a more or less uniform application is achieved also on a large surface.

The invention is based on the initially defined coating device, and its aim is to design the device in such a way, so as to achieve a convenient and fast, thorough cleansing of the spray nozzle and flow paths of the coating compound, while keeping the overall expenditure to a minimum.

This problem can be solved by arranging at least several spray nozzles within the spraying chamber between a spray and cleansing position, so as to be movable, and screening devices for screening the spray nozzles are provided opposite the outer spraying chamber and draining devices for draining off the cleansing agent sprayed in cleansing position.

At this point, a circulation of the cleansing agent is so provided within the coating chamber that, in one respect, the components, which are to be cleansed, can be flushed as thoroughly as possible without obstructing the normal processes in the coating chamber, i.e., the distribution, drying on, and drying out of the coating compound. Thus the cleansing processes can be executed at relatively short coating intervals, without requiring substantial operational processes. The entire coating program can thus be executed, and the paths of the spraying device can be cleansed while changing the coating compound or at intervals, depending on the applied coating compound and its drying sensitivity, without interrupting the entire program.

This becomes relatively easy, if a group of spray nozzles is attached to a joint, pivoted nozzle carrier, which can be arranged without difficulty on elongated coating chambers, e.g., elongated coating drums.

The screens should have at least one catch basin, which is arranged below the spray nozzle, with draining devices connected to the bottom of the catch basin, particularly with a tilted drain pipe. By this, the drainage of the rinsing or cleansing agent is safeguarded irrespective of the number and, to a large extent, arrangement of the spray nozzles. It is, therefore, also possible to make subsequent modifications to the number and arrangement of nozzles, without having to make major changes to the draining devices.

Here the advantage is that the catch basin is an integral part of a casing tube, which encloses the nozzle arrangement on all sides when in cleansing position, and has at least one sealable coating aperture for the spray nozzles. By this method, a cleansing chamber, which is enclosed by the casing tube, is separated within the coating chamber from the external coating chamber surrounding the casing tube. By this separation the coating and cleansing processes can be executed quite independently.

The coating aperture or apertures can have a seal, which is to be opened, in particular, by the spray nozzles against a preload, e.g., by weight or spring power. It would merely require that the nozzles be swiveled against the seal, so as to place them in spray position outside the screening.

The screening devices can, at the same time, form a unilaterally clamped and freely supporting bracket projecting into the coating chamber, at which the nozzle carrier is pivoted. This is particularly advantageous, if the coating chamber is accessible from only one side, as is the case with most elongated drums.

The nozzle carrier which, in particular, is developed as a cylindrical swing pipe, can be provided with a motorized actuator at one end of the swing pipe located outside the coating chamber, while at the other end of the swing pipe, particularly inside the coating chamber, application and coupling devices are provided for the manual turning of the swing pipe, e.g., in such a way, that the coupling devices are attached to a connection which is pivoted in an end wall of the casing tube. This will, in particular, facilitate the servicing and setting operations, if the end wall of the casing tube is removabel also.

At least one section of the nozzle carrier can be carried by a core rod provided with flow channels for the spray and tempering agents. At the same time, the swing pipe can, for practical purposes, be pulled off the core rod, when disengaging it from the driving unit. Therefore, a coupling with an axial degree of freedom, such as a spur gear or star wheel gear coupling, a keyed joint or similar, must be applied.

At the open end of the core rod, at least one reversing chamber can be attached, which connects two channels for the tempering agent. At this open end of the tubular core rod, another reversing chamber for the spray is attached and then connects a supply pipe with an annulus formed between core rod and swing pipe, which supplies the spray. As a result, the spray is intensively tempered during its flow through the core rod and can thereby be set with great accuracy to the predetermined coating temperature.

For practical purposes, the swing pipe is, at the same time, subdivided in two linked pipe sections, which are located at the coupling point on the core rod and sealed against each other, while the spray nozzles are attached only at the external pipe section.

In a particular embodiment of the invention, the casing tube is attached at the open end of the support pipe, which is pivoted in a hub of the coating drum and firmly supported outside said hub at a fixed section of the fixture. Thus an adequate alignment is attained for the support of the casing tube, without application of special reactive forces.

According to a further embodiment, the spray nozzles positioned in cleansing position will be provided at the opposite side with flush nozzles which spray and scour the external surfaces of the spray nozzles. At the same time, the axes of the spray and flush nozzles can intersect below an angle of 5° to 20° at the tip of the spray nozzles. Then the spray is not directed against the nozzle, but at an angle, in order to rinse the entire front surface. However, this rinsing process can also take place during a limited rotary and reciprocating motion of the spray nozzles, so that also the outside components of the spray nozzles can be rinsed during a reciprocating motion from varying directions.

For practical purposes, the casing tube has a flat edgewise section with a lower collecting pipe and gutter, and perpendicularly the side walls forming the coating aperture or apertures. At the same time, the flush nozzles can preferably be installed in the upper, ridge-like section of the casing tube.

The drawing illustrates the currently preferred embodiment of the invention in the form of examples. Of the drawings:

FIG. 5 shows a part section according to line V—V in FIG. 4;

FIG. 6 shows an enlarged part section of point VI in FIG. 2;

FIG. 7 shows a section along line VII—VII in FIG. 6, and

Figure 1:
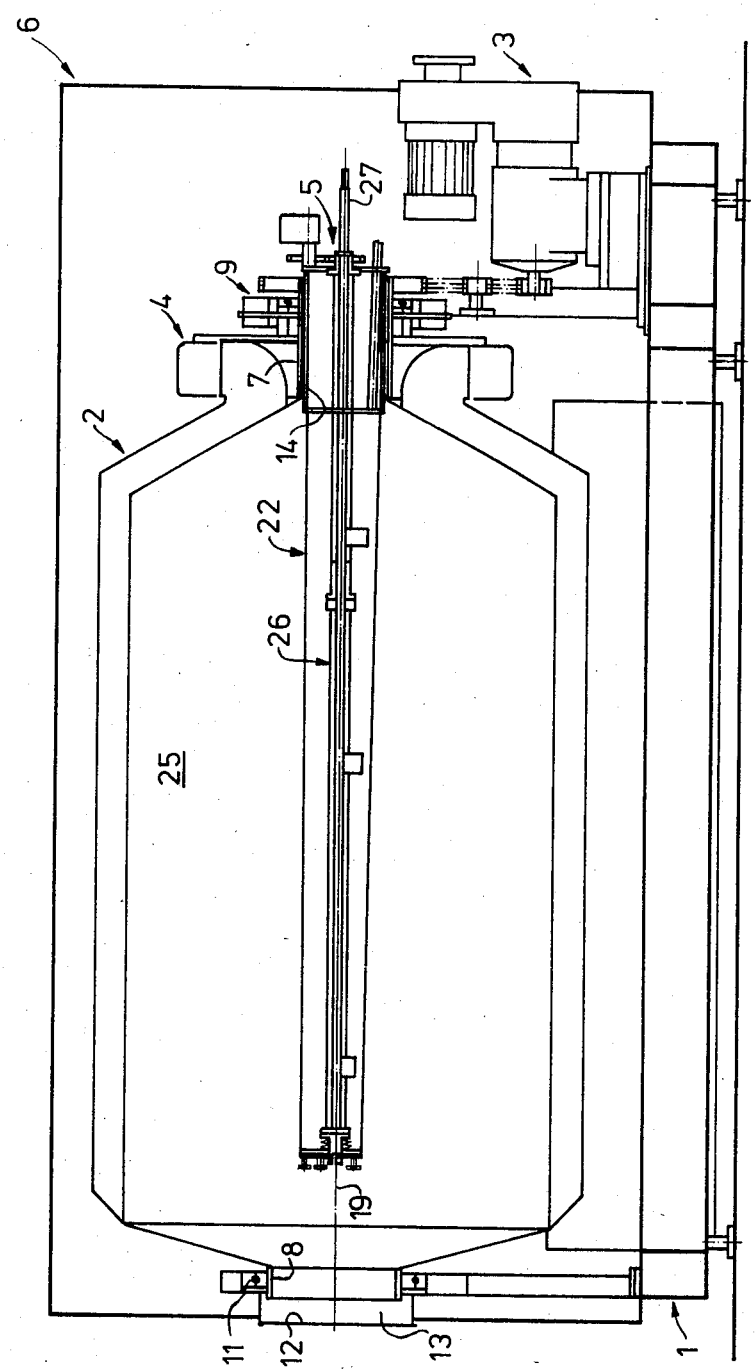
FIG. 1 shows a schematic drawing of a coating device according to the invention, including a coating drum and cleansing device.

The schematic drawing of the coating device shown in FIG. 1 comprises a machine frame 1 for carrying a dragee coating drum 3, a flow distributor 4 for connection with an exhauster and pressure exhaust, an application and cleansing device 5, as well as a housing 6 enclosing these components.

The elongated dragee coating drum 2, which is pivoted around the horizontal drum axis 19, is located in a universal bearing 9 and another pivoted and logitudinally adjustable bearing 11 with its hubs 7, 8 which are attached to both ends of the drum. The hub 8, which remains open during the coating operation, is accessible through an opening 13 in the housing 6 which can be closed by a lid 12. The drum has a sealable opening for charging and discharging, which runs logitudinally in the shell casing of the drum.

Figure 2:
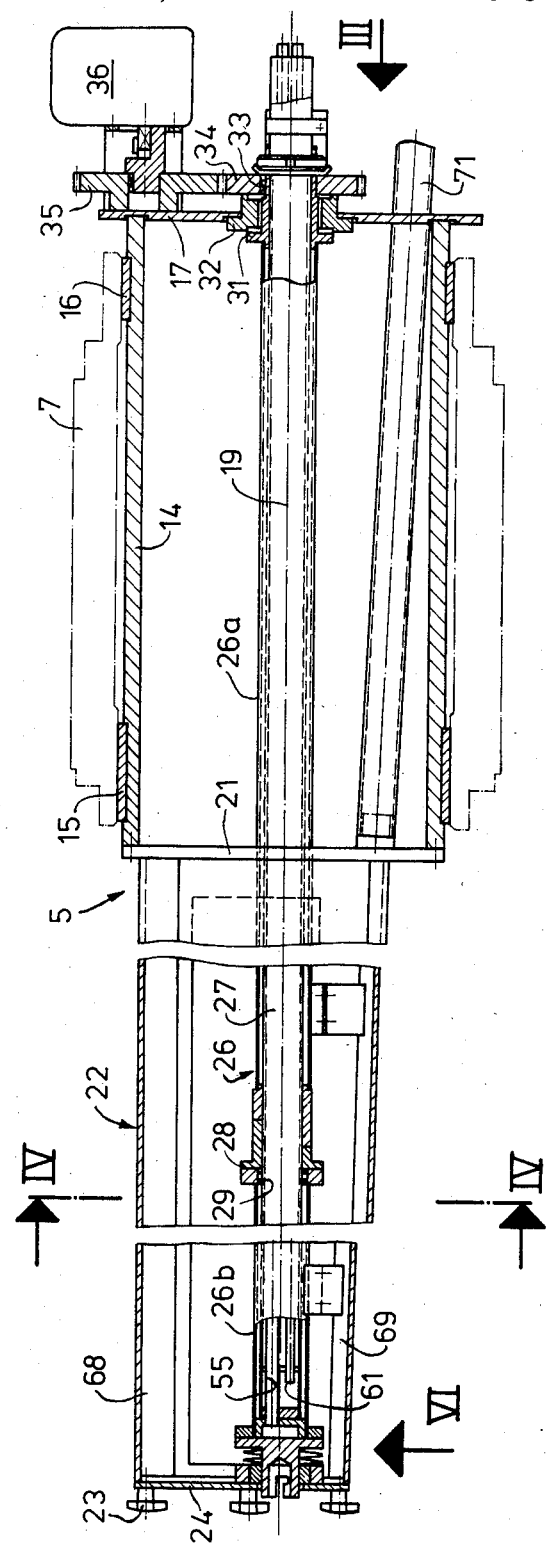
FIG. 2 shows an enlarged scale of a shortened longitudinal section of the mechanical part of the cleansing device.
Figure 3:
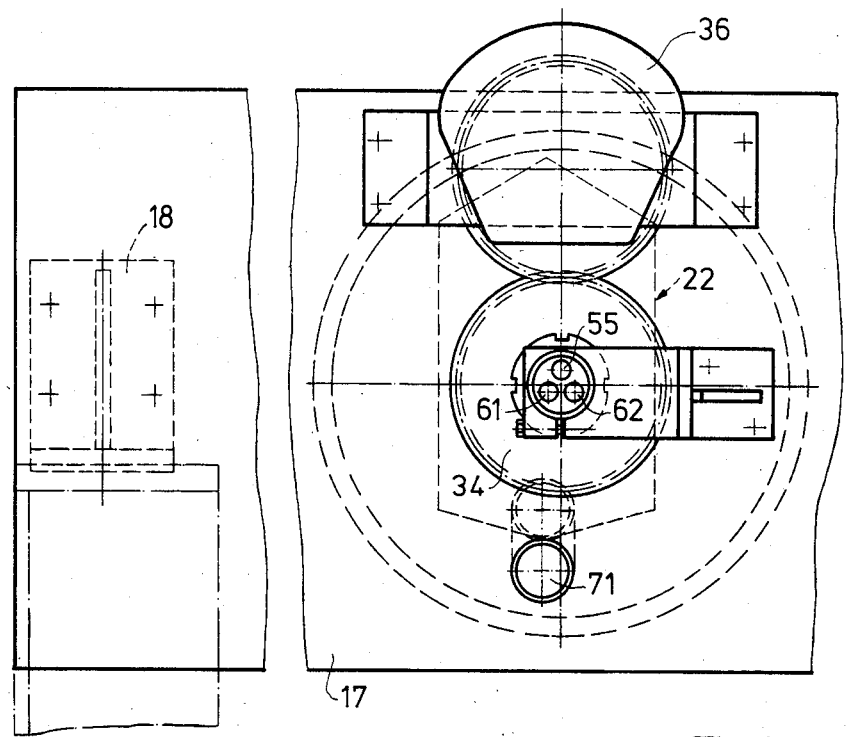
FIG. 3 shows a view of said device in the direction of arrow III in FIG. 2.
Figure 8:
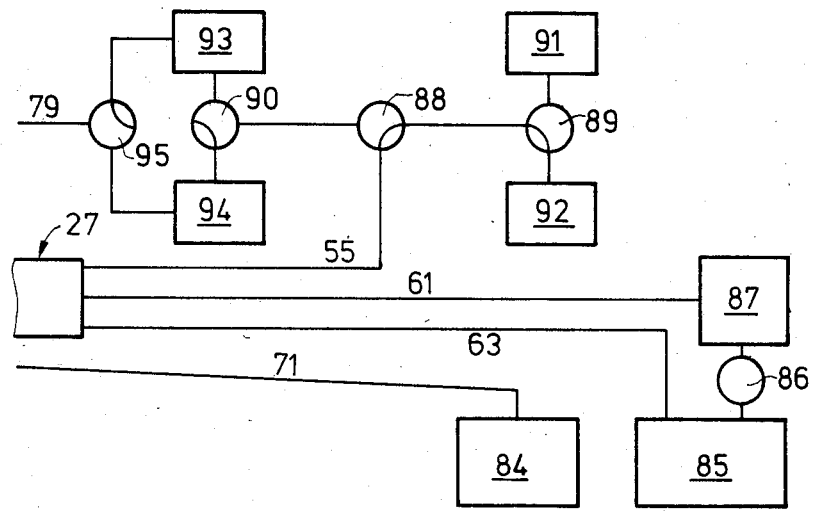
FIG. 8 shows a schematic drawing of a relevant circuit diagram.

The supporting section of the application and cleansing device 5 detailed in FIG. 2 through 8 is a bearing pipe 14, which is pivoted by two bearing bushes 15, 16 in the hub 7 and at its right extremety, as shown in FIG. 2, is sealed toward the outside by a flange plate 17, which is attached with at least one end, as shown in FIG. 3, to a stable connecting piece 18 and thus is fixed in the direction of of the drum axis 19.

At the left extremety of the bearing pipe 14 a prismatic casing tube 22 is flanged as a canterlever by means of an annular flange 21, whose open end carries an end wall 24 which is removable by means of T-screws 23. Thus a casing is formed between the flange plate 17 and end wall 24, which is enclosed on all sides and completely screens the spray components of the applicator and cleansing device toward the outside, which are located within the coating chamber 25 of the coating drum.

An outer swing pipe 26 thus encloses centrically to the drum axis 19 an inner core rod 27 which is tubular also. A coupling 28 fitted with a ring packing 29 is used for providing a sealed subdivision and swing pipe 26 support. Thereby the swing pipe 26 is subdivided in an all round sealed joining pipe 26a and nozzle carrier 26b.

The joining pipe 26a is then fixed with a bearing bushing 31, which is pivoted in a support bushing 32 of the flange plate 17 and connected with a toothed gear 34 by means of a longitudinal keyed joint 33 or another disconnectable coupling, which is connected via another toothed gear 35 with a reversible driving gear 36 developed preferably as an electric motor.

The open end of the nozzle carrier 26b, which is located on the left in the drawing, is welded with a flange plate 37, which is sealed with several coupling pins 38 and connected with the flange 39 in a coupling bushing 41 which is pivoted in a bearing bushing 42 carried at the end wall 24. By means of the Belleville springs 43, which act between the flange 39 and the coupling bushing 41, the swing pipe 26 is pushed toward the right in the drawing, thus maintaining the engagement with the keyed joint 33.

The open end of the coupling bushing 41, projecting through an opening of the end wall 24 to the outside, is hollowed out by means of a counterbore 44, and an angular slot 45 is formed in the wall, so as to accommodate a cotter pin 46. This pin is located at the plug pin 47 of a lever key 48, which fits into the counterbore 44. This enables the manual setting of the swing pipe 26 by means of the lever key 48.

According to FIG. 6, the tubular core rod 27 is sealed off with the centrically screwed on flange disk 52 by means of an end plate 51. Between its outer flange 53, toward the flange 39 of the coupling bushing 41, this flange disk forms a reversing chamber 54 charged by means of a tubular compound pipe 55, which is welded within the core rod, with coating compound and diverts said compound through edge recesses 56 (FIG. 7) to the annular chamber 57 formed between core rod 27 and nozzle carrier 26b.

Figure 4:
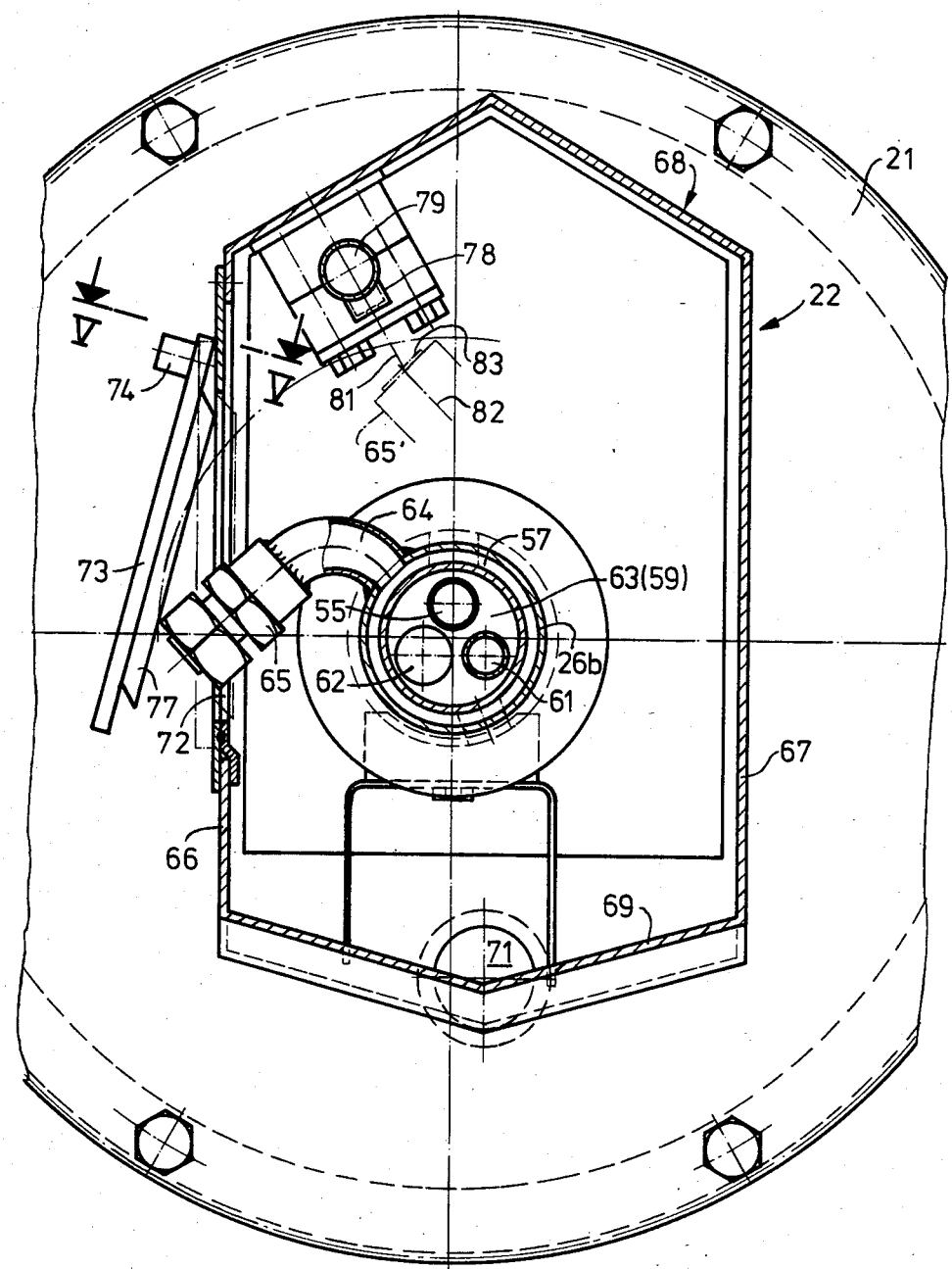
FIG. 4 shows a section according to line IV—IV in FIG. 2.

Another reversing chamber 58 for the tempering agent is formed between the end plate 51 and the transverse wall 59. A tubular preliminary tempering pipe 61, which is welded in the core rod along the drum axis, joins this reversing chamber. As, in addition to this, circular openings 62 are provided in all transverse bulkheads 59, as is illustrated in FIG. 4, the interior space of the core rod 27 forms a return tempering pipe 63 along the entire length of the remaining cross-section of the core rod. This ensures that the entire core rod, including the compound pipe 55, as well as the annular chamber 57, can be tempered exactly to the desired compound temperature. This compound temperature is maintained during the coating process on the short path from the annular chamber 57 through each elbow 64 installed from the outside in the opening of the nozzle carrier 26b and the subsequent spray nozzle 65 (FIG. 4). Seven such spray nozzles located at equal axial intervals are, for instance, provided at the nozzle carrier 26b. The entire nozzle arrangement can, after removing the end wall 24 by pulling off the swing pipe 26 from the core rod 27, be disconnected from the carrier and drive unit, and serviced outside the coating chamber.

The casing tube 22 is equipped with parallel perpendicular side walls 66, 67 which are connected to the top by a ridge covering 68 and to the bottom by a cross-sectionally angular gutter 69. As is well illustrated in FIG. 2 and FIG. 4, this gutter is tilted from the open end of the casing tube 22 to the annular flange 21, where it is connected to a drain pipe 71 which, being tilted in run-off direction, is fixed in the bearing pipe 14.

A coating aperture 72 is provided for each spray nozzle 65 in the side wall 66 of the casing tube 22, said coating aperture can be enclosed by a backplate 60 and sealed by means of a closing plate 60. According to FIG. 5, this closing plate is suspended in the center of a multiply bulged leaf spring 74 by a screw 75, and the two ends of the leaf screw are tightened with screws 76 to the backplate 60. At the inside of the closing plate 73, an apron 77 is attached which, when in closed position, projects across the inner edge of the coating aperture 72 and fully engages this aperture.

The closing plate 73 is thus prestressed due to its dead weight and by the deflection into opening position, which is indicated by full lines in FIG. 4, in the direction of the closing position, as is indicated by the dash-and-dot lines. In the spray position according to FIG. 4, the closing plate 73 is thus held against its restoring force in the opening position, and the coating compound can be sprayed into the coating chamber by the known method. If required, the end position can be adjusted manually by means of the lever key 48. The opening path of the closing plate 73 may also be preset by a cam, or similar, fixed at the nozzle.

If a cleansing operation is to be performed after completion of the coating process, the nozzle carrier 26b is tilted by switching on clockwise the driving motor 36 to the dot-and-dash line indicated rinsing position 65', as is illustrated in FIG. 4, after the coating compound has been extruded completely from the compound pipe 55, annular chamber 57 and spray nozzles 65. In this position, a flush nozzle 78 of a flushing pipe 79 is located opposite each spray nozzle 65, which is so fixed to the ridge covering 68 that in each case the axis 81 of the flush nozzle intersects the axis 82 of the spray nozzle 65 in the tip 83 of this nozzle.

First of all, a rinsing agent is supplied to the spray nozzle 65 through the same pipe as the coating compound is supplied. Following this initial rinsing process, the supply of the rinsing agent to the flush nozzles 78 through the flushing line 79 may overlap with this process. As both axes 81, 82 intersect below an angle of 15°, the tip 83 of the spray nozzles is rinsed during the simultaneous operation of both nozzle groups or during the exclusive operation of the flush nozzles 78. This process may also be varied due to the fact that by reciprocating the driving motor 36 and thus the nozzle carriers 26b, the spray nozzles are reciprocated around their central rinsing position, which is indicated by dash-and-dot lines.

During these rinsing processes, the openings 72 are sealed by their closing plates 73, and thus the entire nozzle arrangement within the casing tube 22 is completely screened off to the outside. The sprayed rinsing and cleansing agent is thus held off the coating chamber 25 and can be supplied via the gutter 69 to the drain pipe 71 of a reservoir 84, as is illustrated in the circuit diagram of FIG. 8.

Also the return pipe 63 for the tampering agent, which extends from the open end of the core rod 27, leads to a reservoir 85 from which the tempering agent is supplied by means of a pump 86 through a tempering device 87 equipped with a thermostatically controlled heat exchanger 87 via the preliminary pipe 61 through the core rod, until it reaches the reversing chamber 58 (FIG. 6).

The compound pipe 55 is connected by the first four-way valve 88 and two other four-way valves 89, 90 of which the former controls the connection with two optional sources 91, 92 for coating compounds of varying quality, while the four-way valve 90 controls the optional connection to the source 93 of a liquid cleansing agent and a compressed air source 94 for blowing out the pipes and lines. The two latter sources 93, 94 can, again, be connected by a parallel four-way valve 95 with the flushing pipe 79.

As with each valve only two of the four possible switch positions can be utilized for the branching control, one of the two other switch positions can be used for the required shut off, provided it is not essential to engage separate shut-off valves for reasons of operating safety. It is understood that basically all switching operations can be executed via separate shut-off valves with additional control valves, if necessary.

According to the switch position shown in the drawing, the compound pipe is connected via the valves 88, 89 to the compound source 92, the two other valves 90, 95 are in cut-off position. In this operational position, a coating process is executed while the closing plate 73 is open (FIG. 4). In order to change the coating compound, it is merely required to shift the valve 89, so as to be connected with the source 91.

If it is desired to subsequently blow out the compound pipe with compressed air, the valve 90 would have to be rotated anticlockwise by 90°, so as to connect it with the compressed air source, subsequent flushing of the flow paths would require a rotation of 90° in the same direction, and the rinsing agent can again be blown out by compressed air.

According to the illustration, the flushing pipe 79 can, independent of the other valves, be connected with the sources 93, 94 by means of the valve 95. The usual precautions are taken to safeguard against wrong connections. For instance, it would be adequate if the flushing pipe 79 were merely connected via a cut-off valve at the connecting pipe between the valves 90 and 88. This would ensure that the rinsing does not concur with the coating operation and that the spray nozzle and flush nozzle can only be connected to the same source 93 or 94.

Other compound sources can be connected to the same nozzle group in addition to the compound sources 91, 92. Several nozzle groups can be connected to the same compound supply pipe, which can be attached to a joint nozzle carrier or several, if necessary, different carriers. But other nozzle grops, e.g., for polishing or similar compounds, can also be attached additionally or, if necessary, outside a casinglike enclosure. As the polishing, as well as the pre-polishing, compound is applied only shortly prior to completion of the drageé coating or other type of coating process, it will suffice if, after the pipes have been blown out, the nozzle group is removed from the coating chamber and cleaned outside during the subsequent operation interruption, prior to the next coating operation.

It is not required that the coating chamber is formed by either a rotatable drum or any other type of drum, but must be limited by stationary walls. For practical purposes, all media are transported at variable speeds, and these processes, as well as the nozzle motion, can be controlled by a preset program.

What is claimed is:

1. A coating device comprising:
   a coating chamber;
   a casing tube;
   a multitude of spray nozzles for applying a coating compound, said spray nozzles being arranged within said casing tube;;
   a cleansing device, for delivering a cleansing agent, allocated to these spray nozzles wherein at least several spray nozzles are pivoted within said coating chamber between a spray position and a cleansing position, and said casing tube is provided for screening the spray nozzles from the coating chamber when said spray nozzles are being cleansed, said chamber enclosing both said spray nozzles and said casing tube; and
   draining devices for draining off the cleansing agent sprayed in the cleansing position.

2. A device as defined in claim 1 wherein a group of spray nozzles is attached to a joint, pivoted nozzle carrier.

3. A device as defined in claim 1 wherein the casing tube has at least one catch basin, which is arranged below the spray nozzles, with a tilted drain pipe connected at its bottom.

4. A device as defined in claim 3 wherein the catch basin is an integral part of the casing tube surrounding the nozzle arrangement in the cleansing position on all sides, and has at least one sealable coating aperture for the spray nozzles.

5. A device as defined in claim 4 wherein the coating aperture or apertures are equipped with a closing plate which is to be opened by the spray nozzles against a preload selected from a weight or spring power.

6. A device as defined in claim 5 wherein the casing tube forms a unilaterally clamped and freely supported bracket at which the nozzle carrier is pivoted.

7. A device as defined in one of the claim 2 wherein the nozzle carrier is a cylindrical swing pipe and provided with a motorized actuator at one end of the swing pipe, which is located outside the coating chamber.

8. A device as defined in claim 7 wherein at the other end of the swing pipe, which is located within the coating chamber, application and/or coupling devices are provided for manual turning of the swing pipe.

9. A device as defined in claim 8 wherein the coupling devices, are attached to a connection which is pivoted in an end wall of the casing tube.

10. A device as defined in one of the claim 2 wherein the end wall of the casing tube is removable.

11. A device as defined in one of the claim 2 wherein at least one section of the nozzle carrier is carried on a core rod which is provided with flow channels for the spray and tempering agents.

12. A device as defined in claim 11 wherein the swing pipe is so provided that it can be pulled off the core rod when disengaging it from its motor-driven unit.

13. A device as defined in claim 12 wherein at the open end of the core rod at least one reversing chamber is attached, which connects the two channels for the tempering agents.

14. A device as defined in claim 13 wherein at the open end of the particularly tubular core rod is attached a reversing chamber for the spray, which connects a supply pipe with an annular chamber which is formed between core rod and swing pipe, supplying the spray nozzles.

15. A device as defined in one of the claim 7 wherein the swing pipe is subdivided in two linked pipe sections, which are located at the coupling point on the core rod and sealed against each other, while the spray nozzles are attached only at the external pipe section.

16. A device with coating drum as defined in claim 1 wherein the casing tube is attached at the open end of the support pipe, which is pivoted in the hub of the coating drum and supported outside said hub at a fixed section of the fixture.

17. A device as defined in claim 1 wherein the spray nozzles in cleansing position are positioned juxtaposed to said flush nozzles.

18. A device as defined in claim 17 wherein the flush nozzles are connected to a special supply pipe and to be charged at intervals toward the flush nozzles.

19. A device as defined in claim 18 wherein the axes of the spray nozzles and flush nozzles intersect below an angle of 5° through 20° at the tip of the spray nozzles.

20. A device as defined in claim 1 wherein the casing tube has a flat edgewise section with a lower collecting pipe and gutter, and perpendicularly has the side walls forming the coating aperture or apertures.

21. A device as defined in claim 20 wherein the flush nozzles are arranged in the upper, ridge-like section of the casing tube.

22. A coating device comprising:
    a coating chamber;
    a multitude of spray nozzles for applying a coating compound, said spray nozzles being arranged within said chamber;
    a cleansing device, for delivering a cleansing agent, allocated to these spray nozzles wherein at least several spray nozzles are pivoted within said coating chamber between a spray position and a cleansing position, and means is provided for screening the spray nozzles from the coating chamber when said spray nozzles are being cleansed, said chamber enclosing both said spray nozzles and said means; and
    draining devices for draining off the cleansing agent sprayed in the cleansing position.

* * * * *